Nov. 13, 1962 W. P. MASON 3,064,213

ELECTROMECHANICAL WAVE TRANSMISSION SYSTEMS

Filed Aug. 14, 1959 2 Sheets-Sheet 1

INVENTOR
W. P. MASON
BY
H. O. Wright
ATTORNEY

Nov. 13, 1962 W. P. MASON 3,064,213

ELECTROMECHANICAL WAVE TRANSMISSION SYSTEMS

Filed Aug. 14, 1959 2 Sheets-Sheet 2

INVENTOR
W. P. MASON
BY H. O. Wright
ATTORNEY 3,064,213

ELECTROMECHANICAL WAVE TRANSMISSION SYSTEMS

Warren P. Mason, West Orange, N.J., assignor to Bell Telephone Laboratories, Incorporated, New York, N.Y., a corporation of New York Filed Aug. 14, 1959, Ser. No. 833,316
2 Claims. (Cl. 333—71)

This invention relates to apparatus and methods for improving the characteristics of oscillatory wave energy transmission systems. More particularly, the invention relates to systems in which one or more transducers effecting conversion of the oscillatory wave energy from electrical to mechanical form and/or vice versa are employed in combination with a mechanical wave filter mechanically connected to the transducer, or transducers.

In prior art systems of the above-indicated type a frequently encountered and often most inconvenient limitation is the relatively restricted predetermined band of frequencies of the oscillatory wave energy which can be freely transmitted. As is well known to those skilled in the art, this limitation is in the usual case primarily a result of the fact that substantially all forms of electromechanical transducers are, as individual units, inherently capable of freely transmitting only a relatively limited frequency band of oscillatory wave energy. While a substantial widening of the frequency band which is freely transmitted by the transducer can be realized by placing an electrical impedance, as for example, an inductance, in series or in shunt with the electrical terminals of the transducer, in accordance with the principles well known and widely used by those skilled in the art, the improvement effected by this measure alone is not sufficient in instances where appreciably wider predetermined frequency pass-bands are required.

A further inconvenience frequently encountered in electromechanical transmission systems of the prior art is the bulk and weight of the mechanical wave filters.

It is, accordingly, a principal object of the invention to substantially widen the predetermined band of frequencies of the oscillatory wave energy which can be freely transmitted while effectively suppressing the transmission of all other frequencies through a system which includes one or more combinations comprising an electromechanical transducer and a mechanical wave filter mechanically interconnected with the transducer for the transmission of the predetermined frequency band of oscillatory wave energy between the transducer and filter.

A further object is to reduce the bulk and weight of mechanical wave filters.

The above principal object is realized in accordance with the principles of the present invention by mechanically interconnecting the electromechanical transducer and mechanical wave filter in such manner that a substantial portion of the so-called "series impedance" of the transducer itself is in effect utilized as a predetermined specific integral portion of the associated mechanical wave filter. The combination of filter and transducer can then freely transmit a substantially wider band of frequencies of the oscillatory wave energy and still effectively suppress all other frequencies. A further increase in the width of the frequency band which can be freely transmitted by the combination of transducer and filter is effected in accordance with the principles of the invention by employing an impedance transforming mechanical filter section immediately adjacent the transducer.

The above-mentioned further object of the invention is effected as an inherent benefit resulting from reduction of the characteristic impedances of mechanical wave filters of the invention as described in detail hereinunder.

The principles of the invention will be more readily understood from a perusal of the following detailed description of specific illustrative embodiments given hereinunder and form the accompanying drawings in which.

Figure 1:
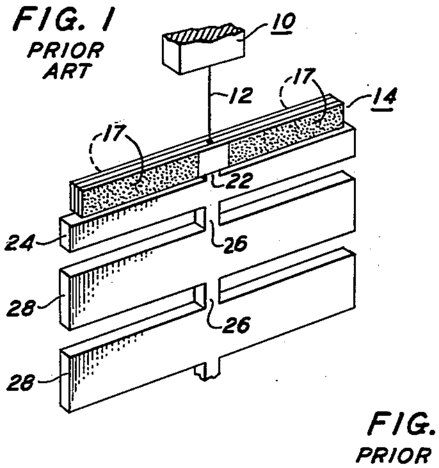
FIG. 1 PRIOR ART
FIG. 1 illustrates a representative electromechanical structure designed in accordance with the teachings of the prior art and employed in the present application for the purpose of comparison with structures of the present invention.

In FIG. 1 a conventionally arranged combination of an electromechanical transducer mechanically interconnected with a mechanical wave filter is indicated by way of example and for purposes of comparison with combinations of the invention. The transmission bandwith (that is, the width of the pass-band, or range of frequencies freely transmitted by the combination with the substantial exclusion of all other frequencies) of this combination can be increased by from 35 to 40 percent by application of the principles of the present invention, as will be described in detail hereinunder.

While the combinations selected in this application for illustrative purposes are of a specific type and are designed to transmit torsional oscillatory mechanical wave energy, it will be obvious to those skilled in the art that the principles of the invention are applicable with equal facility and similar beneficial results to numerous differing forms of combinations designed to transmit longitudinal, shear or flexural oscillatory mechanical wave energy, as well as to other combinations of several differing types in which torsional oscillatory mechanical wave energy is employed.

In more detail in FIG. 1, the elongated transverse members 24, 28, joined by short shaft members 26, comprise a portion of a band pass torsional mechanical wave filter of the generic type disclosed and claimed in the copending joint application of R. N. Thurston and applicant, Serial No. 564,682, filed February 10, 1956. This joint application matured as Patent 2,906,971 granted September 29, 1959. Filters of the present application differ specifically from the filters of the joint application in that the transverse members of the filters of the above-mentioned joint application are discs or spiders instead of simple flat rectangular transverse members.

Figure 3:
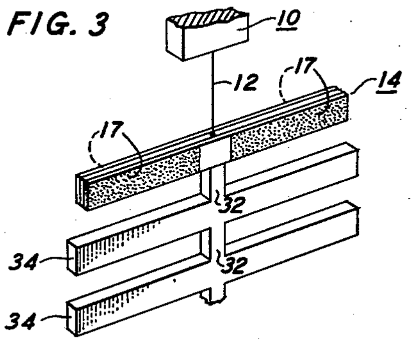
FIG. 3 illustrates an electromechanical structure embodying certain principles of the invention.
Figure 6:
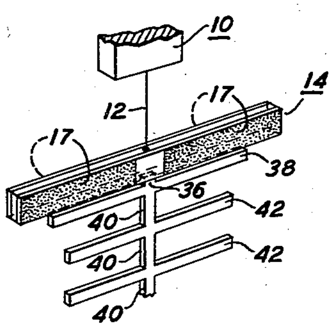
FIG. 6 illustrates an electromechanical structure embodying further principles of the invention.
Figure 8:
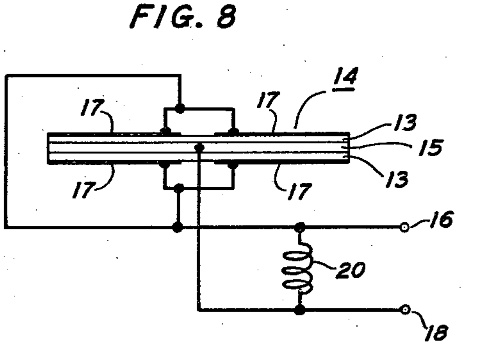
FIG. 8 indicates the electrical circuit connections to the transducers as employed in all of the structures of FIGS. 1, 3 and 6.

An advantage of using simple flat rectangular members as illustrated in FIGS. 1, 3 and 6 is that the whole filter can be stamped in one piece from a single sheet of resilient material, for example steel, which stamping can also obviously include the central conductive plate 15 of transducer 14 (see FIG. 8).

Transducer 14 can, for example, be of the type disclosed and claimed in the copending joint application of R. N. Thurston and applicant, Serial No. 803,007, filed March 30, 1959, and illustrated by FIG. 3 of the drawings accompanying the joint application. This joint application matured as Patent 3,004,176 granted October 10, 1961. The electrical connections to transducer 14 are shown in detail in FIG. 8 and will be described hereinunder. This same transducer having the same electrical connecting circuit as shown in FIG. 8 is employed in all of the illustrative combinations of the present application and is of a double Bimorph type. The structure of the transducer 14 is, in general, antisymmetric about its transverse axis as described in the joint application. On each side of the transverse axis paired piezoelectric or electrostrictive members are mounted. One member of each pair expands and the other contracts under the application of a particular polarity or half cycle of an alternating current electric signal. The members of each pair reverse their respective actions with each successive half cycle of the signal to flex the respective halves of the member in phase opposition so that an oscillatory torsional vibration is imparted to the shaft 22, 26.

Transducer 14 in FIG. 1 is mechanically connected by a very short section 22 of the shaft to the first transverse member 24 of the filter. (An electrical circuit as illustrated in FIG. 8 is connected to transducer 14 but is not shown in FIGS. 1, 3 and 6 since it would tend to obscure mechanical features.) Shaft section 22 is made just sufficiently long to permit member 24 to vibrate in flexure about its transverse axis in response to the torsional oscillations of the transducer. This is necessary since the transducer 14 shunted by inductance 20 (of FIG. 8) should resonate at the mid-frequency of the transmitted band while element 24 should resonate at the lower cutoff frequency of the pass-band. For reasons which will be explained in detail presently, the width of the first transverse member 24 is made one-half the width of subsequent transverse members 28 and provides a "mid-series arm" and "mid-series termination" for the upper end of the mechanical filter. Above the transducer 14 a resilient supporting member 12 comprising for example a short piece of steel wire approximately ten mils (.010 inch) in diameter is centrally attached to transducer 14 and in turn is attached at its upper end to rigid support 10, as shown. The member 12 in addition to supporting the transducer adds a small increment to the impedance of the transducer.

The very short shaft section 22 can be considered as introducing a very high impedance shunted across the input to the filter and it can, for all practical purposes, be ignored.

As shown in FIG. 8, an electrical inductance 20 is shunted across the electrical terminals 16 and 18 which are connected electrically to the transducer conductive electrodes 17 and central conductive plate 15, respectively, of the transducer. A pair of the electrodes 17 are provided on the outer surface of each of the piezoelectric, or electrostrictive, members 13. Electrodes 17 cover all but a small central portion of the surface as indicated in FIG. 8. The transducer assembly can be fabricated and preconditioned in any of the several ways described in my above-mentioned joint application, Serial No. 803,007. Inductance 20 serves to resonate with the interelectrode capacity of the transducer at the mid-frequency of the transmitted (or pass) band of frequencies of the transducer. The effect of such an inductance, as is well known in the art, is to produce an appreciable increase in the bandwidth of the transducer.

In the usual case the filter, in addition to the small portion shown in FIG. 1, will include a large number of other transverse members 28, adjacent members being joined by other shaft sections 26 and a final half width transverse member, like member 24, connected by a short shaft portion like 22 to a second transducer, like transducer 14, the arrangements at the far (lower) end being identical, but occurring in reverse order, with those shown in FIG. 1 and described hereinabove for the near (upper) end. Such an arrangement, of course, employs the second transducer to reconvert the mechanical wave energy transmitted to it through the filter into corresponding electrical wave energy. The duplication in and complication of the drawings which would be required to show the structure in full are however not considered necessary as it is believed that the principles of the invention are adequately illustrated by the portion shown. The second or lower transducer is preferably connected by a second member like member 12 to a rigid support like support 10 to prevent lateral movement of the whole assembly about the point of attachment to upper support 10.

In some instances the far end transducer may be, for example, a sound recording stylus carriage or mechanical "pickup," or the like, but those skilled in the art will have no difficulty with the application of the principles of the invention to such arrangements since they obviously can be essentially identical with those to be described hereinunder.

It will become apparent as the description proceeds that the above remarks in the two immediately preceding paragraphs also apply to the other structures described in this specification as illustrated in FIGS. 3 and 6 of the drawings.

Figure 2:
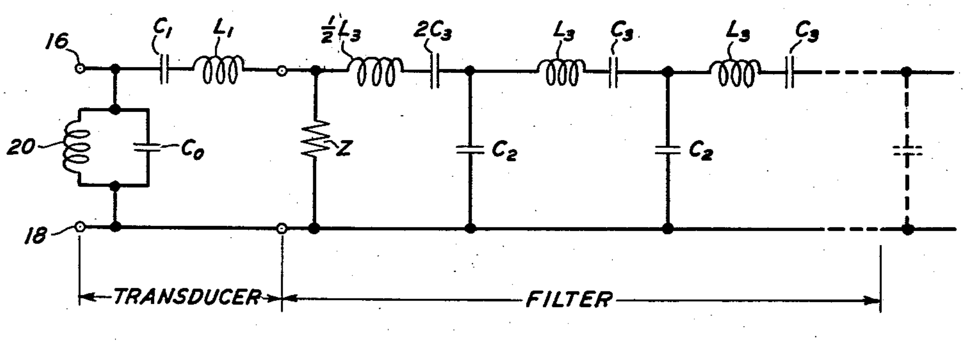
FIG. 2 PRIOR ART
FIG. 2 is an equivalent electrical schematic diagram of the structure of FIG. 1.

In FIG. 2 an equivalent electrical schematic diagram of the structure illustrated in FIG. 1 is given. Inductance 20 represents the shunting inductance 20 of FIG. 8. Capacitance $C_0$ is the shunt capacity of the transducer 14. The combination of inductance $L_1$ in series with capacitance $C_1$ represents the effective series impedance of transducer 14 contributed by its inertia and compliance (or stiffness), respectively, including that of supporting member 12, so that, in accordance with conventional analysis of elecro-mechanical transducers by those skilled in the art the transducer 14 and its shunting inductance 20 can and usually are considered to be equivalent electrically to an electrical wave filter half-section terminated on its right by a "mid-series" termination, i.e. by a series arm $L_1$, $C_1$, having precisely half the impedance of a full series arm of a so-called "ladder" type multisection filter of the same type.

The terminology employed throughout this application in connection with electrical wave filter structures or equivalent electrical schematic diagrammatic representations of mechanical wave filter structures will conform generally to that employed for some decades in the electrical and electro-mechanical wave filter arts. The terminology applicable to electrical wave filters and diagrams of equivalent electrical structures is exemplified, by way of example, in O. J. Zobel's article entitled "Theory and Design of Uniform and Composite Electric Wave Filters" published in the Bell System Technical Journal for January 1923, and in the textbook by T. E. Shea entitled "Transmission Networks and Wave Filters" published by D. Van Nostrand Co., Inc., New York, New York, 1929, as well as in many other publications which have long been well known and extensively used by those skilled in this art. Section 37 at pages 175 through 177 of Shea's book is of particular interest in that it explains the relationships between T, $\pi$ and L type sections of a ladder type filter.

The application of electrical wave filter theory to mechanical wave filter structures and the analogous nature of numerous and varied mechanical structures and structural elements with their respective electrical counterparts have also long been well known and extensively employed by those skilled in the art. Applicant's book entitled "Electromechanical Transducers and Wave Filters" published by D. Van Nostrand Co., Inc., New York, New York, 1948 (Second Edition), is, by way of specific example, a comprehensive text for the electromechanical and mechanical wave filter and related transmission arts.

The portion of the combination comprising the mechanical wave filter per se, as distinguished from the transducer 14, and consisting of transverse members 24, 28, and connecting shaft members 26 of FIG. 1, is represented in the equivalent electrical schematic diagram of FIG. 2 by the ladder type electrical wave filter structure having "full series arms" each consisting of an inductance $L_3$ and a capacitance $C_3$ connected in series (representing a full transverse arm 28 of FIG. 1), alternating with full shunt arms each consisting of the capacitor $C_2$ (representing a shaft member 26 of FIG. 1). By analogy with the equivalent electrical schematic diagram, mechanical wave filters of the types illustrated in the accompanying drawings can aptly be designated as of the ladder type, the shafts representing shunt arms and the transverse members representing series arms, respectively. A "mid-series termination," represented in FIG. 2 by inductance $\frac{1}{2}L_3$ in series with capacity $2C_3$, is provided at the upper end of the mechanical filter per se. The impedance Z of FIG. 2 represents the very large shunting impedance of the very short section of shaft 22 and is of such large magnitude that it can be ignored for all practical purposes.

The filter elements are proportioned, in accordance with long established principles of electrical and analogous mechanical wave filter design, to have the same characteristic impedance and same transmission band as the equivalent filter section representing the transducer 14 of FIG. 1 (consisting of inductances 20 and $L_1$, and capacitors $C_0$ and $C_1$ of FIG. 2 as described in detail above). Such being the case, the impedance of the mechanical filter at its point of connection with the transducer will match the transducer impedance throughout the entire transmission or pass-band.

The Zobel article and Section 37 of Shea's book, both mentioned above, explain how any desired number of predetermined filter sections and sections of related types of filters may be combined to form a unitary ladder type filter structure. Analogous mechanical wave filter structures of numerous and varied types are readily devised and interconnected as taught, for example, in my above-mentioned book.

The structural combination, as illustrated in FIG. 1, and electrically driven as illustrated in FIG. 8, is limited as to the width of the band of frequencies it will freely transmit by the width of the band which the electromechanical transducer 14 in combination with its shunt coil 20 will transmit.

In accordance with the principles of the present invention, however, it is possible by simple modifications of the mechanical wave filter structure associated with the transducer to produce combinations of an electromechanical transducer and a merchanical wave filter which will transmit or pass an appreciably wider band of frequencies than can be transmitted, or passed, by the transducer when joined to a mechanical filter in accordance with the conventional method illustrated by FIG. 1 and described in detail above.

It can be shown that the width of the band of frequencies which the transducer, as a unit, will freely transmit is dependent upon the ratio of capacity $C_1$ to capacity $C_0$ where, as described in connection with FIG. 2 hereinabove, $C_0$ is the capacity measured between the electrical terminals of the transducer and $C_1$ is the electrical capacity equivalent to the mechanical compliance of the transducer.

Stated in another way, if the effective value of capacitance $C_1$ of FIG. 2 could in some way be increased, the ratio of $C_1$ divided by $C_0$ would be increased and the transducer would transmit a wider band of frequencies.

Figure 4:
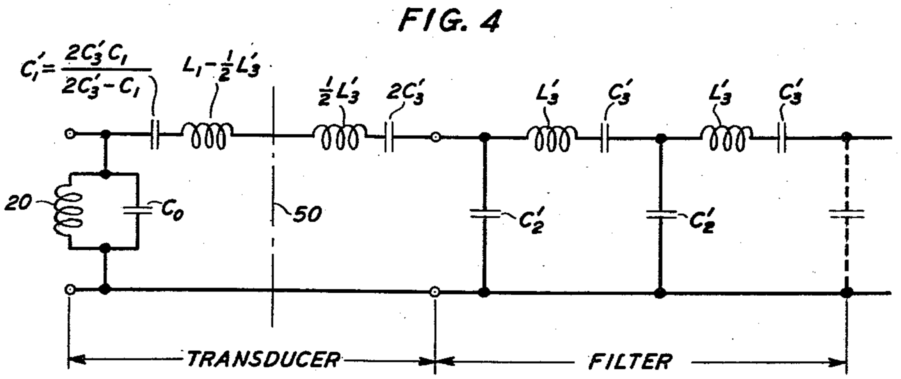
FIG. 4 is an equivalent electrical schematic diagram of the structure of FIG. 3.

A fundamental concept of the present invention is in effect that the transducer's "series arm," consisting of inductance $L_1$ and capacitance $C_1$ in series (as illustrated in the equivalent electrical schematic diagram of the transducer, FIG. 2) should not be considered just a "mid-series" (or half of a series) arm as is done in connection with the conventional combination of FIG. 1, illustrated schematically in FIG. 2. Rather, $L_1$ and $C_1$ in series should be considered as a "full series" arm consisting of one "half or mid-series" arm which is associated with the shunt arm of the transducer comprising $C_0$ and inductance 20 in parallel and a second "half or mid-series" arm which is in effect "appropriated" to serve as the initial "half or mid-series" arm for the first section of the mechanical wave filter. In other words, the portion of the series impedance of the transducer to the left of broken line 50 of FIG. 4 provides a "half or mid-series" arm to be associated with the shunt arm (consisting of inductance 20 and capacitor $C_0$ of the transducer) in forming the equivalent of an electrical filter half section to represent the effective electrical equivalent of the transducer while the portion to the right of line 50 of FIG. 4 serves as the initial half or mid-series arm of the mechanical wave filter. Of course, these two portions of the series impedance of the transducer cannot be physically separated from each other but it is obviously only necessary that the full series impedance of the transducer be equivalent to the combined impedance of the two above-identified "half or mid-series" arms connected electrically in series and to interconnect the transducer and filter by an element of the filter which corresponds in the equivalent electrical schematic diagram to a full shunt arm for the filter.

Referring to the equivalent electrical schematic diagram of FIG. 4, we can then represent the whole series arm of the transducer as consisting of two capacitors $C_1'$ and $2C_3'$ and two inductances $$\frac{L_3'}{2} \text{ and } L_1-\frac{L_3'}{2}$$

all four elements being connected in series, the four elements being the electrical equivalent of the original series combination of capacitor $C_1$ and inductance $L_1$ of FIG. 2. It can be shown that the portion of the transducer represented to the left of line 50 in FIG. 4 by the elements $C_0$, $C_1'$, $L_1-\frac{1}{2}L_3'$ and inductance 20 is a half-section of a filter which will freely transmit a band of frequencies approximately 35 percent wider than the band which will be freely transmitted by the whole transducer as represented by elements $C_1$, $L_1$, $C_0$ and inductance 20 of FIG. 2.

Since the filter and transducer are to transmit the same frequency band and match impedances throughout this frequency band, half of the original inductance $L_1$ can be assigned as being the inductance $\frac{1}{2}L_3'$ where $L_3'$ is the inductance required for a full series arm of the new filter. The new filter as shown in FIG. 3 will differ markedly from the filter of FIG. 1 and the schematic diagram of FIG. 2 because it is to pass a 35 percent wider band of frequencies, and in view of the effective reduction of the series impedance of both the transducer and the new filter it must have a lower characteristic impedance. The band will have the same mid-frequency as for the former filter.

The remainder of the original inductance $L_1$, that is $L_1-\frac{1}{2}L_3'$, must resonate with capacity $C_1'$ at the mid-frequency of the pass-band. This relation fixes the value of capacity $C_1'$. Capacity $C_1'$ can be shown to be $$\frac{2C_3'C_1}{2C_3'-C_1}$$

where $C_1$ is the original capacity as per FIG. 2. Capacitor $2C_3'$ is, of course, the capacity required for the half or mid-series arm for the new filter (being in effect "appropriated" from the whole series impedance of the transducer to function with the new filter). Capacitor $2C_3'$ must resonate with inductance $\frac{1}{2}L_3'$ at the lower cutoff of the pass-band of the mechanical filter. The capacity of $C_1'$ must, obviously, be approximately twice that of the original capacity $C_1$, since $C_1'$ in series with $2C_3'$ must be equivalent to the single original capacity $C_1$ and therefore the ratio of $C_1'$ to $C_0$ is substantially greater than that of $C_1$ to $C_0$ and accordingly, as postulated hereinabove, a wider pass-band will be realized.

Considering the combination consisting of a shunt arm comprising inductance 20 and capacitor $C_0$ in parallel and a series arm comprising a capacity $C_1'$ and inductance $L_1-\frac{1}{2}L_3'$ in series, the pass-band and impedance of the portion of the transducer to the left of line 50 in FIG. 4 which is not assigned for "appropriation" for use as the initial series arm of the new filter can be readily determined and the design of the new filter can then be completed, i.e. the value of capacitor $C_2'$ can be determined, in accordance with principles well known to those skilled in the art. The new filter will provide the same pass-band and have the same characteristic impedance as the above-mentioned portion of the transducer which is not "appropriated" for use as part of the new filter.

Since the initial series arm of the new filter is provided by the above described "appropriation" from the series impedance of the transducer, the first actual arm of the new filter will be the mechanical equivalent of a full shunt arm, consisting of a capacitor $C_2'$, as represented in the electrical schematic diagram of FIG. 4. The full series arms of the new filter will, in like manner, each consist of the mechanical equivalent of the combination of an inductance $L_3'$ and a capacitance $C_3'$ connected in series, as shown in FIG. 4. These full series arms will also, of course, be resonant at the lower cutoff of the pass-band of the filter.

The overall mechanical structure corresponding to the diagram of FIG. 4 is then as shown in FIG. 3. The transducer 14 is the same as that used in FIG. 1 and is electrically connected as shown in FIG. 8. It is mechanically connected to a section of shaft 32. Shaft 32 is of the length required to produce the mechanical equivalent of the above-mentioned full shunt capacitor $C_2'$. The actual filter structure, accordingly, will comprise alternately a section 32 of shaft and a transverse member 34, as shown. Transverse members 34 of FIG. 3, of course, are each the mechanical equivalent of the full series arm $L_3'$, $C_3'$, of the new filter as represented in the equivalent electrical schematic diagram of FIG. 4. If stamped from material of the same kind and thickness as was used for the filter of FIG. 1, transverse members 34 will be slightly less than half the width of transverse members 28 because of the lower characteristic impedance but will be slightly longer than members 28 since they must be resonant, for the specific type of filter shown, at the new lower cutoff frequency, that is at the lowest frequency of the newer and wider band freely transmitted by the combination of the transducer and the new filter. Manifestly the filter structure of FIG. 3 will be appreciably lighter in weight and less bulky than that of FIG. 1.

By way of specific example, where a structure of the type illustrated by FIG. 1 can transmit the frequency band of approximately 7,050 to 7,950 cycles per second (a 12 percent band centered about a mid-frequency of 7,500 cycles per second), a structure of the type illustrated by FIG. 3 can transmit the frequency band of approximately 6,893 to 8,108 cycles per second (a 16.2 percent band centered about a mid-frequency of 7,500 cycles per second). Thus the novel combination illustrated in FIG. 3 and represented by the equivalent electrical schematic diagram of FIG. 4 provides substantially a 35 percent wider band of freely transmitted frequencies than does the combination of FIG. 1.

An additional increase of approximately 5 percent in bandwidth and a further marked reduction in the bulk and weight of the filter over that provided by the combination of FIG. 3 can be realized by introducing an impedance transformation in the filter section immediately adjacent to the transducer, as will be described in detail hereinunder.

A filter section is said to be an impedance transforming section when it has substantially different impedances at its two ends.

Figure 5:
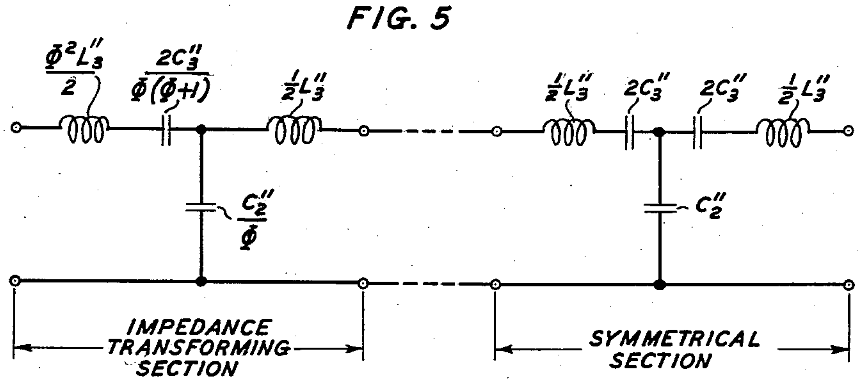
FIG. 5 is an electrical schematic diagram employed in explaining further principles of the invention.

As is well known to those skilled in the art, whenever a filter section is so constituted that it can be represented schematically as having a T of three capacities, i.e. a capacity in each series arm and a capacity in the shunt arm, as shown for example in the symmetrical section to the right in FIG. 5, an impedance transformation can be introduced by modifying the values of the three capacities and one of the series arm inductances. (This type of section is found in numerous and varied filters and occurs generally for the sections of all the filters represented by equivalent electric schematic diagrams in the present application if sections terminated in mid-series arms at each end are separated out.) The procedure is illustrated, for example, in FIG. 181 at page 331 and described on page 332 of T. E. Shea's above-mentioned book. If carried to its limit, this process can result in the complete elimination of one series capacity and substantial reductions in the magnitude of the two remaining capacities of the section. The results of the procedure carried to the point where one series capacity is eliminated are illustrated by the impednace transforming section shown at the left in FIG. 5.

The right-hand section of FIG. 5 is an unmodified or symmertcial section having like mid-series terminations on both ends, i.e., having two half series arms each consisting of a capacitor $2C_3''$ and an inductor $\frac{1}{2}L_3''$ and a single full shunt arm consisting of a capacitor $C_2''$. Since it is a symmetrical section, the impedances at both ends of the section are the same. The designations are double primed in FIG. 5 to indicate that the filter has been designed to pass a 5 percent wider band than the corresponding filter of FIG. 4.

The impedance transforming section has, of course, been subjected to the above-described "impedance transforming" procedure and the capacitor has thus been entirely eliminated from its right series arm. Its shunt capacitor has been reduced in capacity to $$\frac{C_2''}{\Phi}$$

and the left series arm now comprises an inductor having an inductance of $$\frac{L_3''\Phi^2}{2}$$

and a capacitor having a capacity of $$\frac{2C_3''}{\Phi(\Phi+1)}$$

where $\Phi^2$ is the impedance transformation ratio. By way of example, a transformation ratio of substantially 33.8 was found to just eliminate the capacitor in one series arm in a specific case.

Notwithstanding the elimination of the capacitor from the right arm of the impedance transforming section of FIG. 5, the impedance at the right end of the section is the same as that of the symmetrical section to its right and can therefore be connected directly to the mid-series termination of the second section as indicated by the dash lines between the respective terminals, without incurring reflection losses.

The impedance at the terminals of the left end of the first section, however, is increased by the transformation ratio, i.e. by $\Phi^2$.

Of more direct interest for the purposes of the present invention is the fact that the capacity of the capacitor in the left series arm of the impedance transforming section has been reduced by the factor $$\frac{1}{\Phi(\Phi+1)}$$

Figure 7:
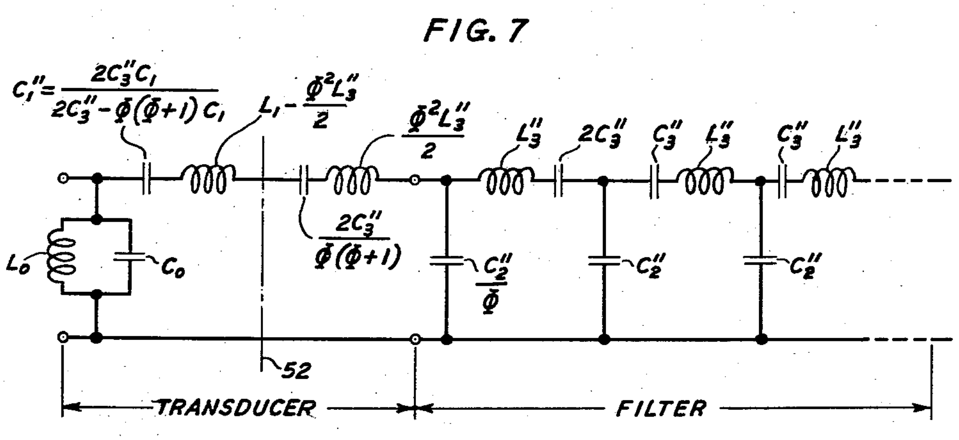
FIG. 7 is an equivalent electrical schematic diagram of the structure of FIG. 6.

If the initial mid-series arm required for the filter is now "appropriated" from the effective series impedance $C_1$, $L_1$ of the transducer, as illustrated in the equivalent electrical schematic diagram shown in FIG. 7, since the capacity required for "appropriation" for the first mid-series arm of the filter has been reduced, the capacity of capacitor $C_1''$ must be further increased (with respect to $C_1'$ of FIG. 4) in order that the two in series be equivalent to the original value of capacity $C_1$. If as stated above, the elements which are in effect "appropriated"

from the transducer's series impedance for use as part of the filter have the values $$\frac{L_3''\Phi^2}{2} \text{ and } \frac{2C_3''}{\Phi(\Phi+1)}$$

then there will be left, as the equivalent electrical series impedance of the transducer, the capacitor $$C_1''=\frac{2C_3''C_1}{2C_3''-\Phi(\Phi+1)C_1}$$

and the inductor $$\left(L_1-\frac{\Phi^2L_3''}{2}\right)$$

Thus the portion of the transducer to the left of the broken line 52 in FIG. 7 will be found to correspond to a wave filter half-section having a bandwidth of approximately 40 percent greater than that of the whole transducer as employed in the structure illustrated by FIGS. 1 and 2, described in detail above, or approximately 5 percent greater than the bandwidth realized by the corresponding portion of the structure of FIG. 4, as described in detail above. This would result in a combination of structure substantially as represented by the equivalent electrical schematic diagram of FIG. 7 where the filter of FIG. 4 is replaced by a similar filter of 5 percent greater bandwidth having a first shunt arm on the left of $$\frac{C_2''}{\Phi}$$

and an adjacent series arm to its right comprisnig the series combination of inductor $L_3''$ and capacitor $2C_3''$. Subsequent shunt arms are $C_2''$ and subsequent series arms are $L_3''$ and $C_3''$ in series, as shown. The portions of the "impedance transforming" section contributed by the filter per se are of course the extreme left shunt arm of the filter comprising capacitor $$\frac{C_2''}{\Phi}$$

and the first series arm of the filter per se, that is the series combination of inductor $L_3''$ and capacitor $2C_3''$. The initial series arm "appropriated" from the series impedance of the transducer to act as an initial arm of the filter is, of course, a portion of the series impedance of the transducer as described in detail above.

A structural combination corresponding to the equivalent electrical schematic diagram of FIG. 7 is illustrated in FIG. 6. It includes transducer 14 supported by short resilient element 12 from rigid support 10, as for the prior combinations illustrated by FIGS. 1 and 3 of the drawings. In the mechanical filter per se, however, a first section 36 of shaft is connected to transducer 14 and is proportioned to provide the mechanical equivalent of the initial shunt arm of the impedance transforming section represented in the diagram of FIG. 7 by capacitor $$\frac{C_2''}{\Phi}$$

The first transverse element 38 is the mechanical equivalent of the adjacent filter series arm represented by the series combination of inductor $L_3''$ and capacitor $2C_3''$. Subsequent shaft sections 40 of the filter then represent the mechanical equivalents of full shunt arms each comprising a capacitor $C_2''$ of the diagram of FIG. 7. Similarly, subsequent transverse elements 42 of the filter represent the mechanical equivalents of full series arms each comprising the series combination of an inductor $L_a''$ and a capacitor $C_3''$ of the diagram of FIG. 7.

To obtain dimensions of the shaft portions and transverse members of the mechanical filter of FIG. 6 which are somewhat comparable with the corresponding dimensions of the corresponding portions of the filter of FIG. 3, it was found necessary (in view of the impedance transformation introduced by the first section of the filter of FIG. 6) to reduce the thickness of the mechanical filter of FIG. 6 to a third of the thickness of the filter of FIG. 3 and to reduce the width of the shaft portions to one-half that of the filter of FIG. 3. Otherwise shaft portions and transverse members of impracticable dimensions subject to vibration in numerous unwanted modes would have resulted. (For example, shaft portions more than thirty times the length of those of FIG. 3 and extremely narrow transvers members would have been required.)

It is thus apparent, since FIGS. 1, 3 and 6 all represent actual designs all drawn to the same scale (all dimensions are tripled, i.e. the scale is three to one), that the introduction of the impedance transforming section at the junction between the transducer and the mechanical filter as illustrated in FIG. 6 not only provides a freely transmitted band approximately 5 percent wider than that of the combination of FIG. 3 but also results in a very substantial reduction in the physical bulk of the mechanical filter. This, of course, is primarily of interest at lower frequencies where the component parts of the mechanical filter tend to become inconveniently large.

To recapitulate, the combination of FIG. 3 provides a freely transmitted band of frequencies substantially 35 percent wider than the band of the combination of FIG. 1 and an appreciably less bulky filter than that of FIG. 1. The combination of FIG. 6 provides a further increase of substantially 5 percent in bandwidth and a very great decrease in the bulk of the filter even when compared with the filter of FIG. 3.

In both of the combinations of FIGS. 3 and 6 the initial mid-series arm of the filter is "appropriated" from the series impedance of the transducer so that the first actual filter element is a full shunt arm. In both combinations the filter is designed to freely transmit the respective wider frequency band which the combination is capable of transmitting. Furthermore, in both the combinations of FIGS. 3 and 6 there is no impedance mismatch at the junction between the transducer and the mechanical filter.

Numeous and varied other structures embodying the principles of the invention and within the spirit and scope thereof will readily occur to those skilled in the art. The above specific examples are illustrative only and are in no sense to be considered as limiting the invention or as exhaustively embracing all possible structures of the invention.

What is claimed is:

1. In combination, an electromechanical transducer, an electrical reactance electrically connected to the electrical terminals of the transducer and resonating with the electrical reactance of the transducer at the mid-frequency of the pass-band of the transducer, and a mechanical band pass wave filter, the filter being mechanically connected to the transducer for the transmission of oscillatory mechanical wave energy between the transducer and the filter, the transducer and its associated electrical reactance constituting a band pass wave filter having a first characteristic impedance and a transmission band of a specific width centered about a specific mid-band frequency, the mechanical filter consisting of a plurality of mechanical elements arranged as a ladder type mechanical wave filter comprising alternate shunt and series arms, the mechanical wave filter having a characteristic impedance of substantially one-half that of the said first characteristic impedance and a pass-band substantially thirty-five percent wider than that of the transducer and its associated electrical reactance, the pass-band of the filter being also centered about the said specific mid-band frequency, the connection to the transducer being effected by an element of the mechanical filter which is a full shunt arm of the mechanical filter.

2. In combination, an electromechanical transducer adapted to convert oscillatory electrical wave energy into mechanical wave energy of a predetermined type and vice versa, an electrical reactance electrically connected to the electrical terminals of the transducer and resonating with the electrical reactance of the transducer at the mid-frequency of the pass-band of the transducer, the transducer and its associated electrical reactance constituting a band pass wave filter having a first characteristic impedance and a transmission band of a specific width centered about a specific mid-band frequency, and a mechanical band pass wave filter adapted to transmit oscillatory mechanical wave energy of the predetermined type and consisting of a plurality of mechanical elements arranged in a ladder type structure, successive elements coupling adjacent elements for the transmission of the mechanical wave energy alternately in series and in shunt relation, the mechanical connection between the transducer and the filter consisting of a full shunt element of the filter, the main portion of the mechanical filter having a characteristic impedance which is a small fractional part of the characteristic impedance of the transducer and its associated electrical reactance, the shunt arm of the filter connecting to the transducer and the series arm of the filter connecting to this shunt arm comprising a portion of an impedance transforming filter section proportioned and adapted to transform the characteristic impedance of the main portion of the filter to an impedance which is substantially one-half that of the characteristic impedance of the transducer and its associated electrical reactance, the filter having a pass-band substantially forty percent wider than the pass-band of the transducer and its associated electrical reactance, the wider pass-band of the filter being also centered about the said specific mid-band frequency.

References Cited in the file of this patent

UNITED STATES PATENTS

| | | |
|---|---|---|
| 2,112,560 | Davies | Mar. 29, 1938 |
| 2,167,078 | Lakatos | July 25, 1939 |
| 2,501,488 | Adler | Mar. 21, 1950 |
| 2,662,217 | Roberts | Dec. 8, 1953 |
| 2,877,432 | Mattiat | Mar. 10, 1959 |
| 2,906,971 | Mason et al. | Sept. 29, 1959 |